United States Patent
Mirza

(10) Patent No.: US 9,811,748 B2
(45) Date of Patent: Nov. 7, 2017

(54) ADAPTIVE CAMERA SETTING MODIFICATION BASED ON ANALYTICS DATA

(71) Applicant: Verizon Patent and Licensing Inc., Arlington, VA (US)

(72) Inventor: Momin Mirza, Santa Clara, CA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 60 days.

(21) Appl. No.: 14/299,803

(22) Filed: Jun. 9, 2014

(65) Prior Publication Data

US 2015/0358537 A1  Dec. 10, 2015

(51) Int. Cl.

| | |
|---|---|
| *G06K 9/03* | (2006.01) |
| *H04N 5/232* | (2006.01) |
| *G06T 7/00* | (2017.01) |
| *H04N 21/258* | (2011.01) |
| *H04N 21/2187* | (2011.01) |
| *H04N 21/226* | (2011.01) |
| *H04N 21/2343* | (2011.01) |
| *H04N 21/2543* | (2011.01) |

(52) U.S. Cl.
CPC ............ *G06K 9/036* (2013.01); *G06T 7/0002* (2013.01); *H04N 5/23206* (2013.01); *H04N 5/23229* (2013.01); *H04N 21/2187* (2013.01); *H04N 21/226* (2013.01); *H04N 21/234363* (2013.01); *H04N 21/2543* (2013.01); *H04N 21/25841* (2013.01); *H04N 21/25891* (2013.01); *G06T 2207/30168* (2013.01)

(58) Field of Classification Search
None
See application file for complete search history.

(56) References Cited

U.S. PATENT DOCUMENTS

| | | | |
|---|---|---|---|
| 8,594,182 B1* | 11/2013 | Pardue | ................... 375/240.01 |
| 8,786,425 B1* | 7/2014 | Hutz | ................... H04M 11/04 340/506 |
| 9,013,294 B1* | 4/2015 | Trundle | ............... G08B 25/001 340/501 |
| 9,230,250 B1* | 1/2016 | Parker | .................. G06Q 20/203 |
| 2003/0025800 A1* | 2/2003 | Hunter et al. | ........... 348/208.13 |
| 2005/0271251 A1* | 12/2005 | Russell et al. | ................. 382/103 |
| 2008/0297599 A1* | 12/2008 | Donovan | ............ G06F 17/3079 348/143 |
| 2009/0022362 A1* | 1/2009 | Gagvani et al. | .............. 382/100 |
| 2010/0190480 A1* | 7/2010 | Zheng | .............. G08B 13/19621 455/414.1 |
| 2010/0208064 A1* | 8/2010 | Liu | .................. G08B 13/19667 348/143 |
| 2014/0293048 A1* | 10/2014 | Titus | ................ G08B 13/19608 348/143 |
| 2014/0320590 A1* | 10/2014 | Laurentino et al. | ....... 348/14.08 |

* cited by examiner

Primary Examiner — Roberto Velez
Assistant Examiner — Quan Pham

(57) ABSTRACT

The quality at which camera data (e.g., images, video, and/or audio captured by a camera device) is transmitted and/or stored may be adjusted based on the application of analytic techniques. For example, a camera processing device may receive camera data and receive information relating to conditions external to the capturing of the camera data. The camera processing device may control the resolution associated with the camera data based on the information relating to the conditions.

19 Claims, 10 Drawing Sheets

300 ——▶

| Condition | Quality Score |
|---|---|
| Event = Amber Alert | +50 |
| Event = Inmate Escape | +50 |
| Pixel-based classification = Person | +25 |
| Pixel-based classification = Animal | -25 |
| User location = Home | -50 |
| User location = Away | +25 |
| Usage remaining > 1 GB | +50 |
| Useage remainig < 1 GB | -50 |
| User compression setting = Low | +20 |
| User compression setting = Medium | 0 |
| User compression setting = High | -20 |
| Network connection = LAN | +50 |
| Network connection = Cellular | -25 |
| Recipient device type = Smart phone | -25 |
| Recipient device type = Smart TV | +25 |
| Recipent device storage capacity > 10 GB | +25 |
| Recipent device storage capacity < 10 GB | -25 |

300 ⟶

| Condition | Quality Score |
|---|---|
| Event = Amber Alert | +50 |
| Event = Inmate Escape | +50 |
| Pixel-based classification = Person | +25 |
| Pixel-based classification = Animal | -25 |
| User location = Home | -50 |
| User location = Away | +25 |
| Usage remaining > 1 GB | +50 |
| Useage remainig < 1 GB | -50 |
| User compression setting = Low | +20 |
| User compression setting = Medium | 0 |
| User compression setting = High | -20 |
| Network connection = LAN | +50 |
| Network connection = Cellular | -25 |
| Recipient device type = Smart phone | -25 |
| Recipient device type = Smart TV | +25 |
| Recipent device storage capacity > 10 GB | +25 |
| Recipent device storage capacity < 10 GB | -25 |

Fig. 3

ADAPTIVE CAMERA SETTING MODIFICATION BASED ON ANALYTICS DATA

BACKGROUND

Cameras, including video cameras, may be used for a number of purposes, including security and/or location monitoring. Image and/or video data, captured by cameras, can be relatively large, which can tend to burden storage devices, and for remote storage, can burden network resources.

BRIEF DESCRIPTION OF THE DRAWINGS

FIG. 3 illustrates an example data structure that may store information used to determine a cumulative quality score;

DETAILED DESCRIPTION OF THE PREFERRED EMBODIMENTS

The following detailed description refers to the accompanying drawings. The same reference numbers in different drawings may identify the same or similar elements.

Systems and/or methods, as described herein, may determine, based on the application of analytic techniques, the quality at which camera data (e.g., images, video, and/or audio captured by a camera device) should be transmitted and/or stored. As an example, video, captured by the camera device, may be transmitted at a relatively low resolution based on a determination that the video is of relatively low interest to a recipient of the video. As another example, a video, captured by the camera device, may be transmitted at a relatively low resolution (e.g., the camera may be controlled to capture low resolution video) based on a determination that a metered network usage account of a sender of the video is nearing its limits during a billing cycle. As such, bandwidth usage may be reduced when transmitting camera data in response to a determination relating to the importance of the camera data and/or resources available to store and/or transmit the camera data.

Figure 1:
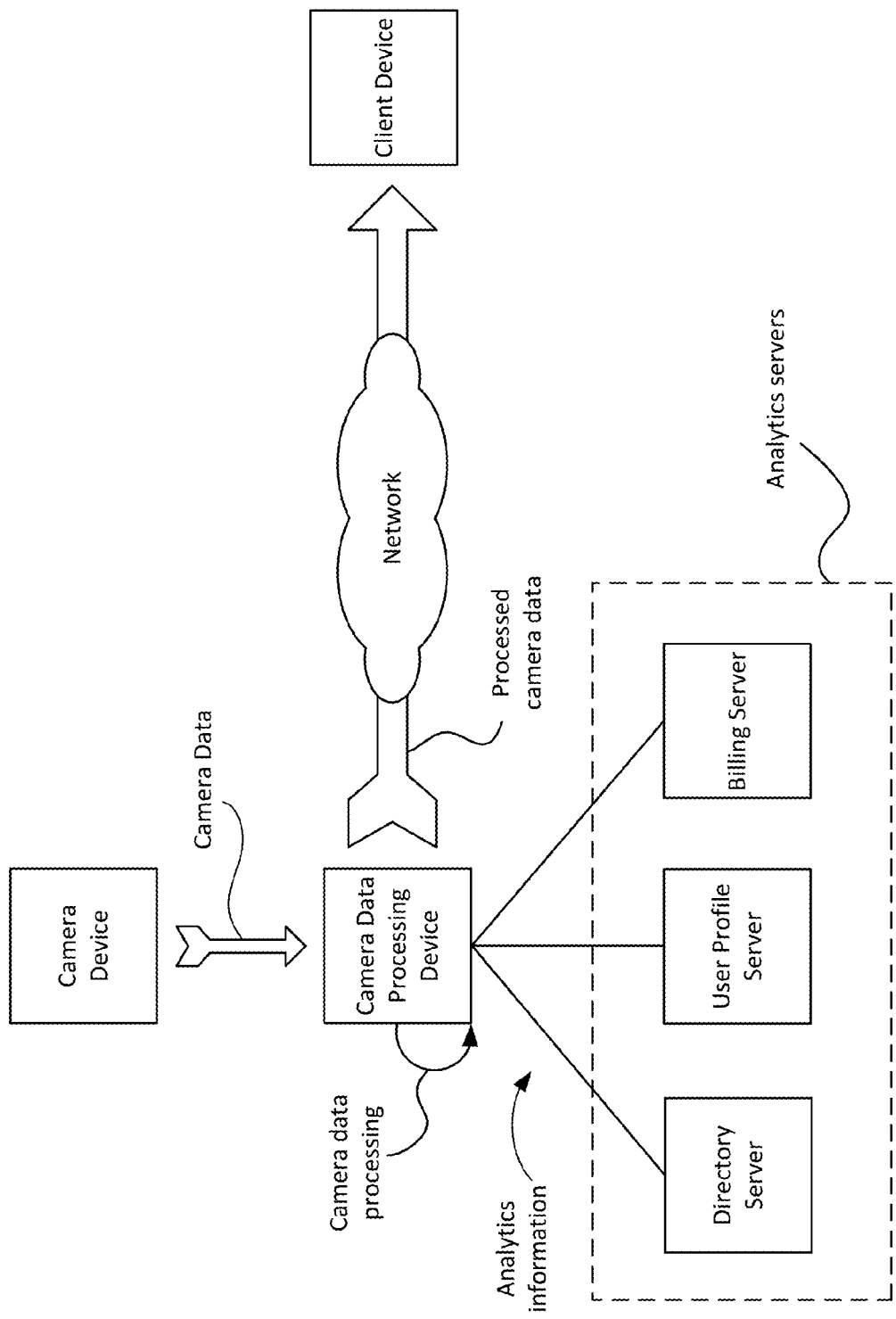
FIG. 1 illustrates an example overview of an implementation described herein.

FIG. 1 illustrates an example overview of an implementation described herein. In FIG. 1, a camera device may output camera data towards a client device. For example, the camera device may be a security camera that may automatically output the camera data based on detecting motion. Additionally, or alternatively, the camera device may be implemented within a user device (e.g., a mobile phone, tablet, etc.) and may output the camera data based on receiving an instruction from a user of the camera device. Additionally, or alternatively, the camera device may be some other type of device that may output camera data towards client device at any time.

As shown in FIG. 1, the camera device may output the camera data to a camera data processing device. The camera data processing device may process the camera data based on analytics information received from one or more analytics sources (e.g., a directory server, a user profile server, a billing server, some other type of server, and/or sensors associated with the camera or with a facility in which the camera is installed).

The term "analytics information" may refer to external information relating to conditions external to the capturing of camera data. For example, the analytics information may include information received from the directory server (e.g., information relating to security threat levels, weather information, event information, etc.). Additionally, or alternatively, the analytics information may include remaining metered network usage information received from the billing server. Additionally, or alternatively, the analytics information may include user information from the user profile server (e.g., information relating to a user's habits, locations, preferences, etc.). Additionally, or alternatively, the analytics information may include some other type of external information identifying events and/or other conditions, etc.

The camera data processing device may determine conditions based on the analytics information (e.g., events, weather, security levels, an amount of metered network usage remaining on an account, an amount of storage remaining on a receiving device, etc.), and may generate a quality score. The quality score may indicate the extent to which the camera data should be compressed (e.g., the quality score is inversely proportional to the level of compression). Additionally, or alternatively, the quality score may be used to determine settings that the camera device may establish when capturing images, audio, and/or video (e.g., resolution settings for videos).

In some implementations, the quality score may relate to the importance of the camera data. Additionally, or alternatively, the quality score may relate to an amount of storage available to store the camera data and/or remaining network usage available to transmit the camera data. As a result, camera data having a relatively lower quality score (e.g., camera data that is determined to be relatively unimportant, destined for a storage device having a relatively low amount of storage, and/or transmitted using an account having a relatively low amount of network usage available to transmit the camera data), may be stored at a lower resolution than camera data having a relatively higher quality score.

As an example, the camera data processing device may determine a relatively lower quality score when the analytics information indicates that a viewer of the camera data is relatively uninterested in the contents of the camera data (e.g., based on information in the user profile server that identifies the recipient's interests). For example, assume that the camera device is a security camera device for a home, and that the camera device continuously outputs video, captured by the camera device, to a storage device (e.g., the client device). Further, assume that the user profile server stores information indicating that the owner of the home is located at the home during the hours of 7 PM-7 AM. Given these assumptions, the camera data processing device may determine that video recorded during the hours of 7 PM-7 AM may have a relatively low quality score and may be substantially compressed or recorded at a lower resolution (e.g., in order to reduce the resolution and size of the video) since the owner of the home is present during these hours, and is unlikely to view the video. On the other hand, the camera data processing device may determine that video recorded outside of the hours of 7 PM-7 AM may have a relatively high quality score and should not be compressed so that a video that captures an intruder may be captured at the camera device's highest capable resolution (e.g., to better aid in the identification of the intruder).

As another example, the camera data processing device may determine a quality score that is proportional to the amount of metered data usage remaining (e.g., an amount of data remaining for transportation over the network) on an account associated with the camera device. For example, the billing server may store information identifying an amount of remaining metered data usage on the account, and the camera data processing device may determine a quality score proportional to the remaining amount of metered data usage. That is, the less the amount of metered data usage remaining, the lower the quality score of the camera data.

As another example, the camera data processing device may determine a quality score and process camera data based on event information stored by the directory server. For example, the camera data processing device may determine a relatively higher quality score and increase the resolution of video, captured by the camera device, based on information indicating an increase in a security threat level (e.g., to better aid in monitoring during high security threat levels). Similarly, the camera data processing device may determine a relatively lower quality score and decrease the resolution of the video based on information indicating a decrease in the security threat level (e.g., to reduce bandwidth consumption when higher resolutions are not needed).

Figure 2:
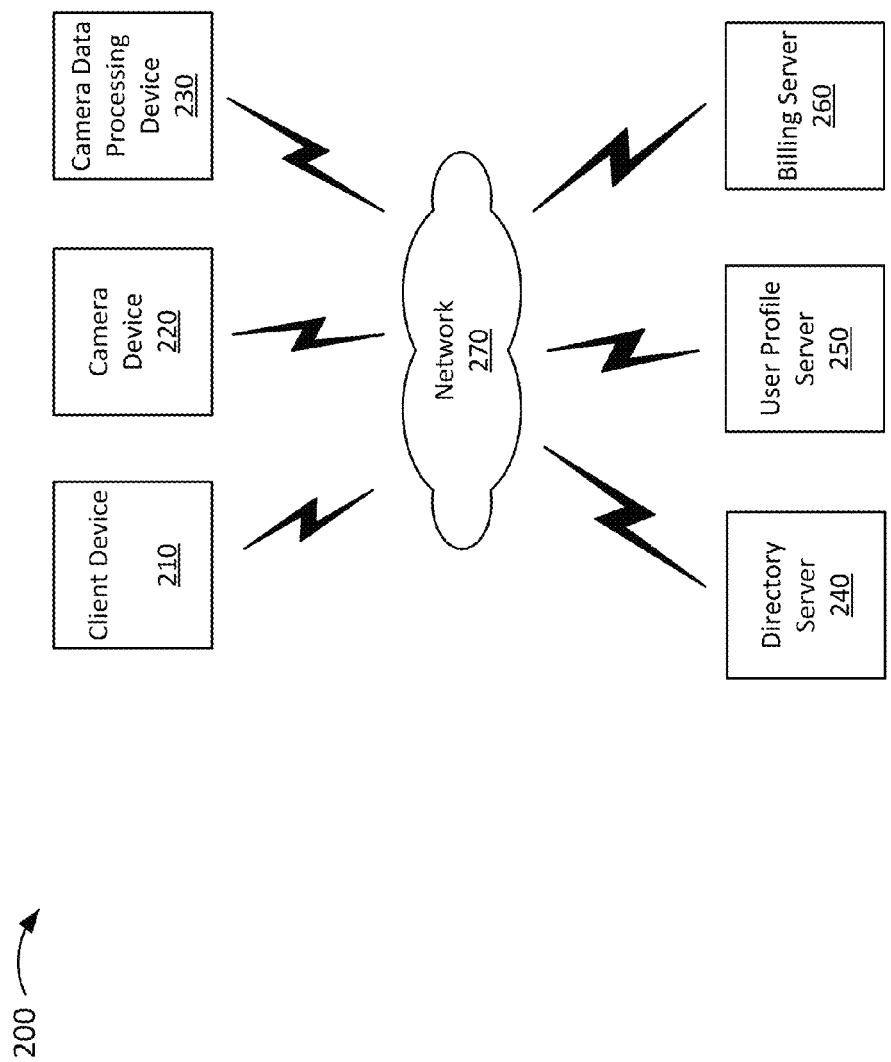
FIG. 2 illustrates an example environment in which systems and/or methods, described herein, may be implemented.

FIG. 2 is a diagram of an example environment 200 in which systems and/or methods described herein may be implemented. As shown in FIG. 2, environment 200 may include client device 210, camera device 220, camera data processing device 230, directory server 240, user profile server 250, billing server 260, and network 270.

Client device 210 may include a device capable of communicating via a network, such as network 270. For example, client device 210 may correspond to a mobile communication device (e.g., a smart phone or a personal digital assistant (PDA)), a portable computer device (e.g., a laptop or a tablet computer), a desktop computing device, a server device, or another type of computing. Client device 210 may receive camera data from camera device 220 (e.g., via camera data processing device 230). In some implementations, client device 210 may include a storage device that may store the camera data. For example, client device 210 may include a cloud storage device or an off-site storage device to receive and store camera data from a camera device 220 located in a different facility from client device 210. In some implementations, client device 210 may be associated with a monitoring party that may receive and analyze images, audio, and/or video captured by camera device 220.

Camera device 220 may include one or more image, audio, and/or video capturing camera devices. In some implementations, camera device 220 may output camera data (e.g., images, audio, and/or video captured by camera device 220) to client device 210 via camera data processing device 230. In some implementations, camera device 220 may be implemented within a user device. Additionally, or alternatively, camera device 220 may be a security camera implemented in a facility. Additionally, or alternatively, camera device 220 may be some other type of camera implemented in some other manner (e.g., on lighting fixtures, utility poles, etc.).

Camera data processing device 230 may include one or more computing devices, such as a server device, a collection of server devices, or another computing device. In some implementations, camera data processing device 230 may receive camera data from camera device 220 and destined for client device 210. Camera data processing device 230 may process the camera data prior to outputting the camera data to client device 210. For example, camera data processing device 230 may process and/or compress the camera data in order to reduce bandwidth consumption during the transmission of the camera data (e.g., by reducing a size of the camera data).

Camera data processing device 230 may determine the extent to which the camera data may be compressed based on information received from directory server 240, user profile server 250, billing server 260, and/or some other source. For example, camera data processing device 230 may generate a quality score that indicates the extent to which the camera data should be compressed and/or the resolution at which camera data is to be captured or transmitted. In some implementations, camera data processing device 230 may generate a quality score based on some other information, such as pixel-based classification information or sensors located within or near a premises associated with camera device 220 or camera data process device 230. For example, camera device 230 may identify an event based on a signal received from a sensor (e.g., a motion sensor, a door sensor, a window sensor, a temperature sensor, etc.), and may generate a quality score based on the type of event (e.g., corresponding to a signal received from a particular sensor, or a particular voltage of the received signal). In some implementations, camera data processing device 230 may be implemented within camera device 220 or separate from camera device 220. For example, camera processing device 230 may be implemented as processing logic within camera device 220, or as a server or computing device external to camera device 220.

Directory server 240 may include one or more server devices that may store information regarding events, weather, crime reports, public alerts, public security threat levels, and/or some other information that camera data processing device 230 may use to determine the extent to which camera data may be compressed, and/or settings (e.g., resolution settings) that camera device 220 may establish when capturing images, audio, and/or video. For example, when directory server 240 outputs information regarding an increase in a public security threat level, camera data processing device 230 may output video at relatively high resolution (e.g., by minimally compressing the video and/or instructing camera device 220 to increase the resolution of video being captured). As another example, when directory server 240 outputs information regarding the ending of an event where relatively high resolution may have been beneficial, camera data processing device 230 may output video at a relatively low resolution (e.g., by increasing video compression and/or instruction camera device 220 to decrease the resolution of the video).

User profile server 250 may include one or more server devices that may store user profile information, such as information regarding habits, activity, preferences, and/or locations of a user associated with camera data captured by camera device 220. In some implementations, user profile server 250 may store user location information based on location information received from a user device of the user (e.g., a smart phone carried by the user). Additionally, or alternatively, user profile server 250 may store user location information based on information received from a location beacon (e.g., a network device) associated with a user device of the user. For example, when the user device connects with the network device, the network device may output information indicating that the user is located at within a particular range of the network device. In some implementations, user profile server 250 may output user profile information to camera data processing device 230, and camera data processing device 230 may adjust camera data compression and/or camera settings based on the user profile information.

Billing server 260 may include one or more server devices that may store billing information for a user of camera device 220. For example, billing server 260 may store information identifying an amount of network usage remaining on the user's account. In some implementations, camera data processing device 230 may adjust camera data compression and/or camera settings based on the billing information.

Directory server 240, user profile server 250, and/or billing server 260 may be analytics servers that may output analytics information to camera data processing device 230. As described above, camera data processing device 230 may use the analytics information to determine a score that indicates the extent to which camera data may be compressed (or settings that camera device 220 may establish when capturing images, audio, and/or video).

Network 270 may include one or more wired and/or wireless networks. For example, network 270 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, network 270 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

The quantity of devices and/or networks in environment 200 is not limited to what is shown in FIG. 2. In practice, environment 200 may include additional devices and/or networks; fewer devices and/or networks; different devices and/or networks; or differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

FIG. 3 illustrates an example data structure 300 that may store information used to determine a cumulative quality score. In some implementations, data structure 300 may be stored in a memory of camera data processing device 230. In some implementations, data structure 300 may be stored in a memory separate from, but accessible by, camera data processing device 230 (e.g., a "cloud" storage device). In some implementations, data structure 300 may be stored by some other device in environment 200, such as client device 210, camera device 220, directory server 240, user profile server 250, and/or billing server 260. A particular instance of data structure 300 may contain different information and/or fields than another instance of data structure 300.

Each entry in data structure 300 may identify a quality score associated with a particular condition. Camera data processing device 230 may generate a cumulative quality score based on identifying one or more conditions (e.g., conditions corresponding to analytics information received from directory server 240, user profile server 250, billing server 260, and/or some other source). For example, camera data processing device 230 may generate the cumulative quality score by summing corresponding quality scores for each identified condition. The cumulative quality score may be used to determine the extent to which camera data processing device 230 should compress camera data prior to outputting the camera data to client device 210. Additionally, or alternatively, the cumulative quality score may be used to determine settings that camera device 220 may establish when capturing camera data. For example, the cumulative quality score may be proportional to the quality of the camera data (e.g., the resolution of an image and/or bitrate of audio).

As an example, camera data processing device 230 may receive information identifying an event (e.g., an event relating to an AMBER alert) from directory server 240, and may add 50 points to a cumulative quality score. Similarly, camera data processing device 230 may receive information identifying a different event (e.g., an event relating to an escape of an inmate at a nearby facility), and may add 50 points to the quality score. In some implementations, camera data processing device 230 may add or subtract to the quality score based on information identifying some other type of event (e.g., an event relating to a security breach). Camera data processing device 230 may receive the information identifying an event from some other source other than directory server 240 (e.g., from a sensor, a motion detector, etc.).

As another example, camera data processing device 230 may add or subtract to the cumulative quality score based on pixel-based classification information. For example, camera data processing device 230 may add 25 points to the cumulative quality score when the pixel-based classification information indicates a person in an image or video captured by camera device 220. Camera data processing device 230 may subtract 25 points to the cumulative quality score when the pixel-based classification information indicates an animal in the image or video captured by camera device 220 (e.g., since an image of a person may be deemed to be of greater importance than an image of an animal). Additionally, or alternatively, camera data processing device 230 may add or subtract from the cumulative quality score based on pixel-based classification information identifying a particular individual.

As another example, camera data processing device 230 may add or subtract to the cumulative quality score based on a location of a user of camera device 220. For example, camera data processing device 230 may subtract 50 points from the cumulative quality score when the user is located in at a home location (e.g., based on information received from user profile server 250, a user device, and/or a beacon associated with the user). Camera data processing device 230 may add 25 points from the cumulative quality score when the user is located away from the home location (e.g., since images and/or video captured when the user is home may be deemed to be of less importance than when the user is away from home). In some implementations, camera data processing device 230 may add or subtract from the cumulative quality score based on information regarding the users location (e.g., as receive from user profile server 250, a user device, and/or a beacon associated with the user, such as a network device via which a user device of the user communicates).

As another example, camera data processing device 230 may add or subtract to the cumulative quality score based on an amount of network usage remaining for an account associated with a user of camera device 220 (e.g., based on information stored by billing server 260). For example, camera data processing device 230 may add 50 points to the cumulative quality score when the amount of remaining network usage is greater than 1 gigabyte (1 GB), and may subtract 50 points from the cumulative quality score when the amount of remaining network usage is less than 1 GB (e.g., to conserver network usage when the amount of network usage remaining is less than a particular threshold).

As another example, camera data processing device 230 may add or subtract to the cumulative quality score based on a user's preferred quality or compression setting. For example, camera data processing device 230 may add 20 points for a "low" compression setting (e.g., corresponding to a "high" quality setting), or may subtract 20 points for a "high" compression setting (e.g., corresponding to a "low" quality setting). In some implementations, the user may adjust the compression settings in order to modify the level of compression in which camera data processing device 230 processes camera data. For example, the user may select a "low" compression setting if relatively higher camera data quality is desired in favor of bandwidth usage. The user may select a "high" compression setting if relatively lower bandwidth usage is desired in favor of relatively lower camera data quality.

As another example, camera data processing device 230 may add or subtract to the cumulative quality score based on a type of network to which camera device 220 is connected. For example, camera data processing device 230 may add 50 points to the cumulative quality score when camera device 220 is connected to a LAN. Camera data processing device 230 may subtract 25 points when camera device 220 is connected to a cellular network (e.g., to conserve bandwidth usage when outputting camera data via the cellular network).

As another example, camera data processing device 230 may add or subtract to the cumulative quality score based on the type of device of a recipient of the camera data (e.g., the type of device of client device 210). For example, camera data processing device 230 may subtract 25 points from the cumulative quality score when the type of device of client device 210 is a smart phone. Camera data processing device 230 may add 25 points to the cumulative quality score when the type of client device 210 is a Smart TV (e.g., since lower quality may be deemed to be acceptable for a smart phone whereas a higher quality may be acceptable for a Smart TV).

As another example, camera data processing device 230 may add or subtract to the cumulative quality core based on the amount of storage remaining on client device 210. For example, camera data processing device 230 may add 25 points to the cumulative quality score when the amount of storage remaining on client device 210 exceeds a particular threshold (e.g., 10 GB), and may subtract 25 points when the amount of storage remaining on client device 210 is below the particular threshold (e.g., to conserver storage space on client device 210 when the available storage is below the particular threshold).

While particular fields are shown in a particular format in data structure 300, in practice, data structure 300 may include additional fields, fewer fields, different fields, or differently arranged fields than are shown in FIG. 3. Also, FIG. 3 illustrates examples of information stored by data structure 300. In practice, other examples of information stored by data structure 300 are possible. For example, data structure 300 may store different quality scores for different conditions. Information stored by data structure 300 may be set by a user of camera device 220 and/or preconfigured within camera data processing device 230. Also, data structure 300 may store other conditions than what are shown. For example, data structure 300 may store conditions and corresponding quality scores relating to a direction that camera device 220 is pointed, current weather conditions, and/or some other type of analytics data.

In some implementations, the quality scores may be weighted based on the condition. For example, a quality score for a particular condition may be weighted higher than the quality score for another condition. In some implementations, one or more quality scores may be summed to obtain a cumulative quality score. Additionally, or alternatively, one or more quality scores may be multiplied in order to obtain the cumulative quality score. In some implementations, the quality scores for a particular condition may apply when a different condition applies. For example, the quality score relating to the remaining network usage condition may only apply when camera device 220 is connected to a cellular network or other type of network in which network usage is metered.

Figure 4:
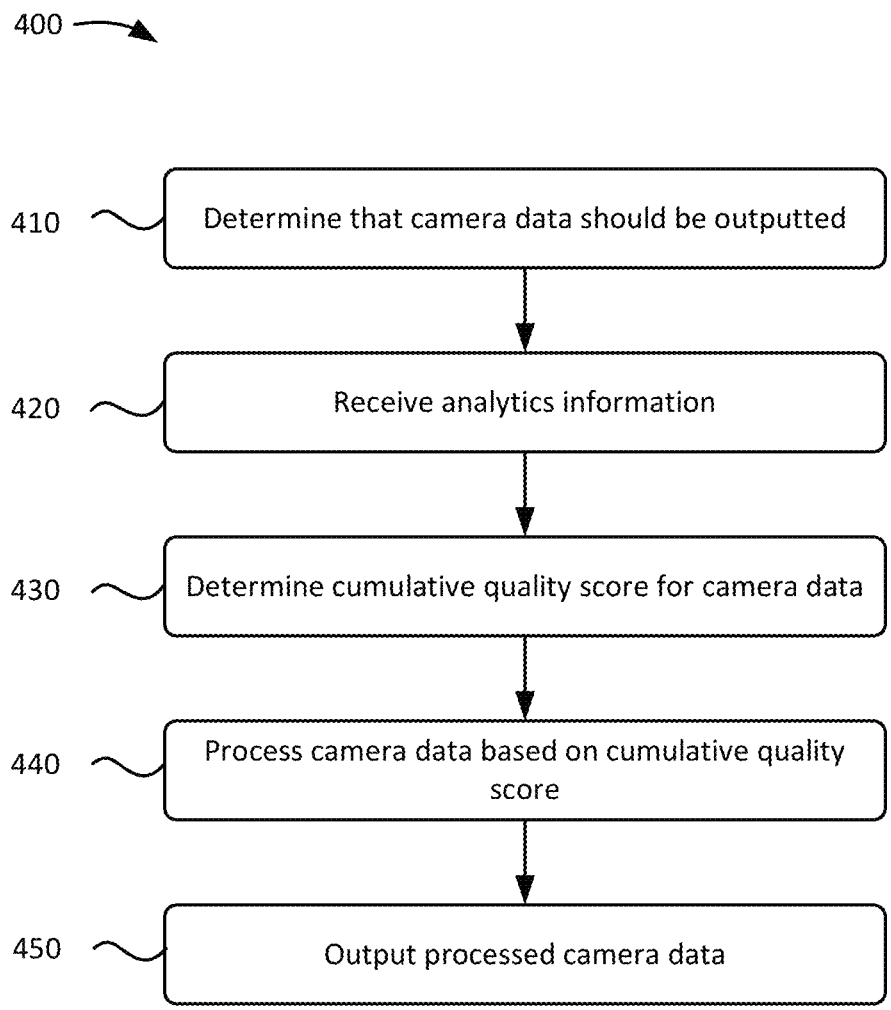
FIG. 4 illustrates a flowchart of an example process for outputting camera data that is processed based on a cumulative quality score.

FIG. 4 illustrates a flowchart of an example process 400 for outputting camera data that is processed based on a cumulative quality score. In some implementations, process 400 may be performed by camera data processing device 230. In some implementations, some or all of blocks of process 400 may be performed by one or more other devices.

As shown in FIG. 4, process 400 may include determining that camera data should be outputted (block 410). For example, camera data processing device 230 may determine that camera data should be outputted to client device 210 based on receiving a request for the camera data from client device 210. Additionally, or alternatively, camera data processing device 230 may determine that camera data should be outputted when camera device 220 detects motion (e.g., when camera device 220 is implemented as part of a security system). Additionally, or alternatively, camera data processing device 230 may determine that camera data should be outputted based on some other trigger.

Process 400 may also include receiving analytics information (block 420). For example, camera data processing device 230 may receive analytics information from directory server 240, user profile server 250, billing server 260, and/or some other source. In some implementations, camera data processing device 230 may request the analytics information based on determining that the camera data should be outputted. Additionally, or alternatively, camera data processing device 230 may periodically receive and store the analytics information prior to determining that the camera data should be outputted.

Process 400 may further include determining a cumulative quality score for the camera data (block 430). For example, camera data processing device 230 may determine the cumulative quality score for the camera data based on the analytics information and information stored by data structure 300. In some implementations, camera data processing device 230 may determine the cumulative quality score by combining individual quality scores associated with conditions identified by the analytics information (e.g., conditions relating to events, user location, pixel-based classification information, network usage remaining, compression settings, a type of network via which camera device 220 communicates, a type of the receiving client device 210, storage space remaining on client device 210, etc.). Additionally, or alternatively, camera data processing device 230 may determine the cumulative quality score by combining the individual quality scores using another linear or non-linear technique (e.g., a neural network based technique or other machine learning based technique). In some implementations, camera data processing device 230 may determine the cumulative quality score based on user interactions with the camera data. For example, user interactions with the camera data (e.g., enhancing an image, clipping a video, etc.) may indicate that the camera data is of importance, and camera data processing device 230 may add to the cumulative quality score.

Camera data processing device 230 may determine the cumulative quality score based on information identifying user quality settings (e.g., information identifying "high," "medium," "low," etc. quality or compression settings, or a particular resolution and/or audio bitrate) in addition to other analytics information. In some implementations, camera data processing device 230 may determine the cumulative quality score based on analytics information that does not include user quality settings information. Some examples of determining cumulative quality scores are described above with respect to FIG. 3.

Process 400 may also include processing the camera data based on the cumulative quality score (block 440) and outputting the processed camera data (block 450). For example, camera data processing device 230 may process the camera data based on the cumulative quality score (e.g., by compressing the camera data to a particular extent corresponding to the cumulative quality score). As an example, camera data processing device 230 may compress the camera data (e.g., by reducing the resolution of an image and/or video included in the camera data, reducing a bitrate of audio included in the camera data, etc.). In some implementations, camera data processing device 230 may compress the camera data by a particular amount based on the cumulative quality score. In some implementations, camera data processing device 230 not compress the camera data if the cumulative quality score exceeds a particular threshold. As a result, camera data processing device 230 may compress the camera data based on the importance of the camera data, an amount of remaining network usage, an amount of remaining storage space, and/or some other information corresponding to the cumulative quality score. Further, camera data processing device 230 may output the processed camera data to client device 210. Since the camera data may be reduced in resolution (e.g., when the quality score is below a particular threshold), bandwidth usage may be reduced in relation to when the camera data is not reduced in resolution.

In some implementations, camera processing device 230 may process the camera data by reducing the camera data to audio-only data (e.g., in a situation where video is determined to be relatively unimportant in relation to audio, such as for child monitoring applications). For example, camera processing device 230 may delete or remove video data while retaining audio data, thereby reducing the size of the camera data.

In some implementations, camera data processing device 230 may process the camera data based on some other factor than the cumulative quality score and the analytics information. For example, camera data processing device 230 may stich images and/or video from multiple camera devices 220 together when the multiple camera devices 220 capture a moving person or object.

Figure 5:
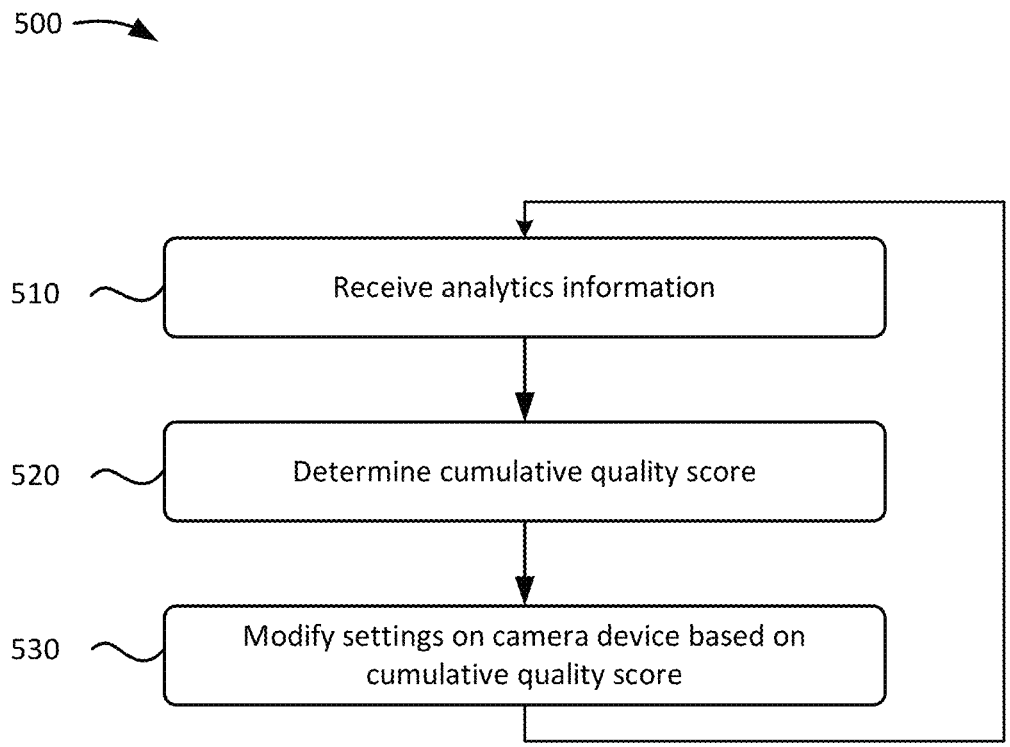
FIG. 5 illustrates a flowchart of an example process for modifying settings on a camera device based on a quality score.

FIG. 5 illustrates a flowchart of an example process 500 for modifying settings on a camera device based on a quality score. In some implementations, process 500 may be performed by camera data processing device 230. In some implementations, some or all of blocks of process 500 may be performed by one or more other devices.

As shown in FIG. 5, process 500 may include receiving analytics information (block 510). For example, camera data processing device 230 may receive analytics information from directory server 240, user profile server 250, billing server 260, and/or some other source. Camera data processing device 230 may periodically receive and store the analytics information.

Process 500 may further include determining a cumulative quality score (block 520). For example, camera data processing device 230 may determine the cumulative quality score based on the analytics information as described above.

Process 500 may also include modifying settings on a camera device based on the cumulative quality score (block 530). For example, camera data processing device 230 may modify settings on camera device 220 based on the cumulative quality score. In some implementations, camera data processing device 230 may modify resolution settings, audio bitrate recording settings, and/or some other setting based on the cumulative quality score. As an example, camera data processing device 230 may reduce a resolution setting when the quality score drops below a particular threshold (e.g., when the analytics information indicates that video being captured by camera device 220 is relatively unimportant based on conditions identified by the analytics information). Similarly, camera data processing device 230 may increase the resolution setting when the quality score exceeds the particular threshold.

In some implementations, process 500 may be continuously repeated to adjust camera device 220 settings as conditions change. For example, camera data processing device 230 may increase the resolution on camera device 220 based on receiving analytics information regarding an increase in a security threat level. Camera data processing device 230 may decrease the resolution on camera device 220 based on receiving analytics information regarding a decrease in the security threat level.

Figure 6:
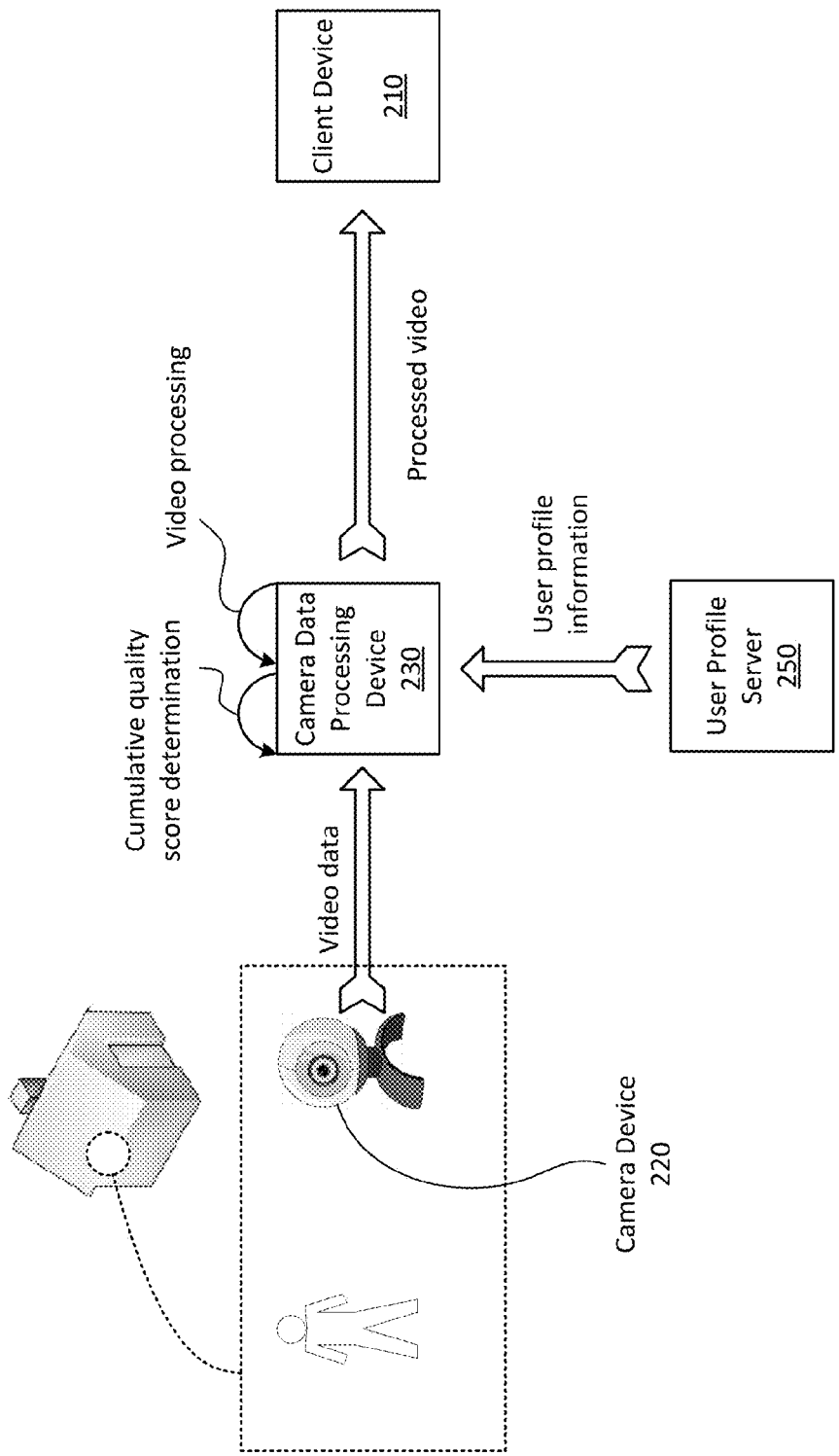
FIGS. 6-8 illustrates an example implementation for processing video captured by a camera device.
Figure 7:
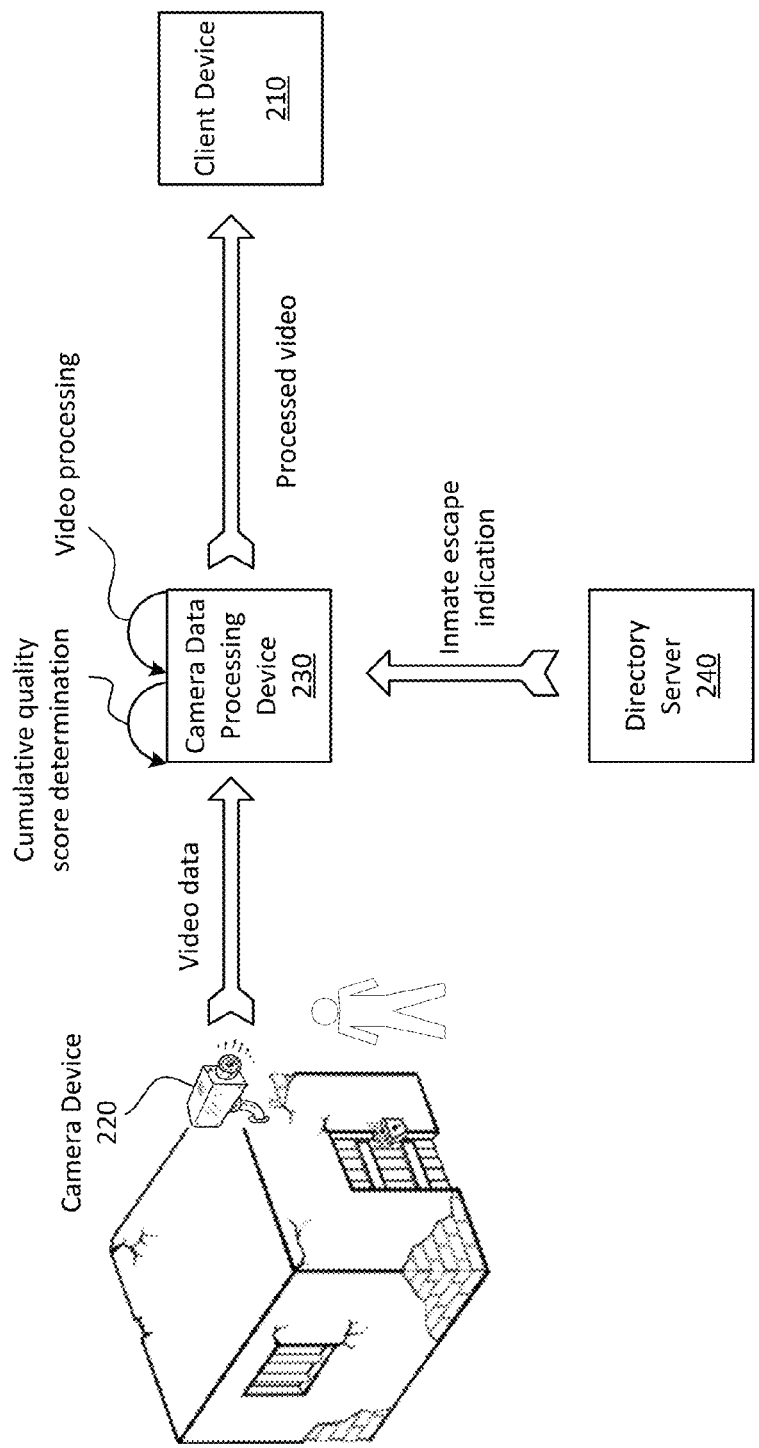
Figure 8:
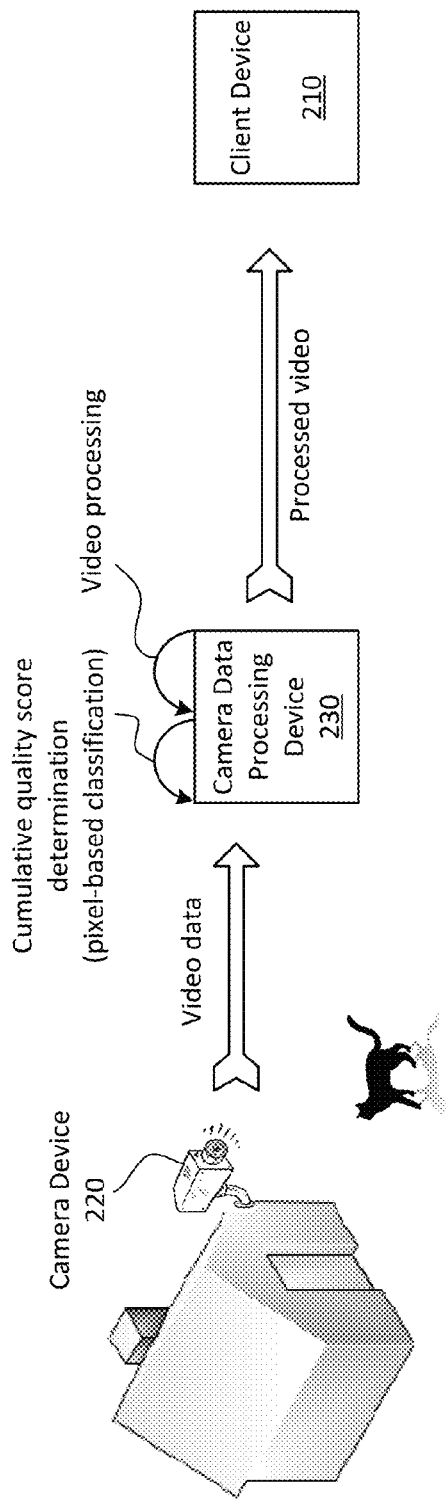

FIGS. 6-8 illustrate an example implementation for processing video captured by a camera device. In FIG. 6, assume that camera device 220 is located within a home as part of a home security system. As shown in FIG. 6, camera device 220 may provide video data to camera data processing device 230. For example, camera device 220 may provide a video that includes a person in the home. Camera data processing device 230 may determine a cumulative quality score for the video based on user profile information received from user profile server 250. For example, assume that the user profile information indicates that the owner of the home is not home during the time that the video was captured. Given this assumption, camera data processing device 230 may determine a relatively high quality score, indicating that the video should be processed at a relatively high quality (e.g., so that a possible intruder may be identified). Camera data processing device 230 may process the video based on the quality score, and output the processed video to client device 210. If, for example, the video was captured during a time when the owner is located in the home (e.g., based on the user profile information), the quality score may be relatively lower, and the processed video may be processed at a lower resolution, thereby reducing bandwidth consumption. Alternatively, the video may not be transmitted during times in which the owner is home (e.g., since the owner may not be interested in storing security footage when the owner is home).

Referring to FIG. 7, assume that camera device 220 is associated with a security system of a particular facility (e.g., a correctional facility). As shown in FIG. 7, camera device 220 may output video data to camera data processing device 230, and camera data processing device 230 may determine a cumulative quality score based on analytics information received from directory server 240 (e.g., an indication of an inmate escape event). Camera data processing device 230 may process the video based on the cumulative quality score, and output the processed video to client device 210. In the example of FIG. 7, camera data processing device 230 may determine a relatively high quality score and process the video at a relatively high resolution (e.g., to aid in implementing security processes relating to the inmate escape event).

Referring to FIG. 8, camera data processing device 230 may receive video data from camera device 220, and may determine a cumulative quantity score based on pixel-based classification information. For example, camera data processing device 230 may determine a relatively low quality score based on pixel-based classification information identifying that the video includes a stray animal (versus a possible intruder). Camera data processing device 230 may process the video at a relatively low resolution, and output the processed video, thereby reducing bandwidth consumption when outputting a video that may be of relatively low interest.

Figure 9:
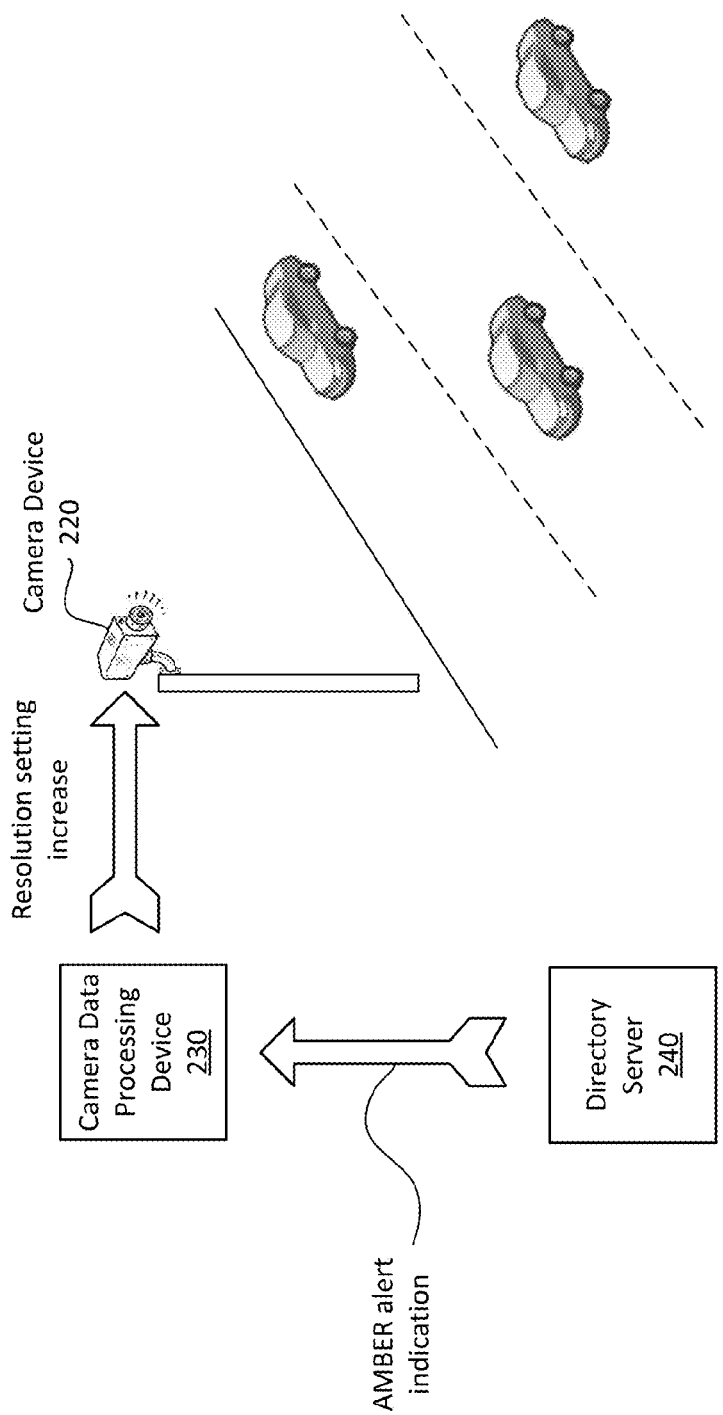
FIG. 9 illustrates an example implementation for modifying settings on a camera device based on a cumulative quality score.

FIG. 9 illustrates an example implementation for modifying settings on a camera device based on a cumulative quality score. In FIG. 9, assume that camera device 220 is part of traffic monitoring system. As shown in FIG. 9, camera data processing device 230 may receive, from directory server 240, an indication of an event (e.g., an AMBER alert event). Based on receiving the AMBER alert indication, camera data processing device 230 may determine a cumulative quality score. For example, camera data processing device 230 may determine a relatively high cumulative quality score in relation to when an AMBER alert event is not transpiring. Camera data processing device 230 may increase the resolution setting on camera device 220 based on determining the cumulative quality score (e.g., corresponding to the AMBER alert) in order to better identify vehicles and/or vehicle license plates during the AMBER alert event. Camera data processing device 230 may reduce the resolution on camera device 220 when receiving an indication regarding the end of the AMBER alert event.

While particular examples are shown in FIGS. 6-9, the above descriptions are merely example implementations. In practice, other examples are possible from what is described above in FIGS. 6-9.

Figure 10:
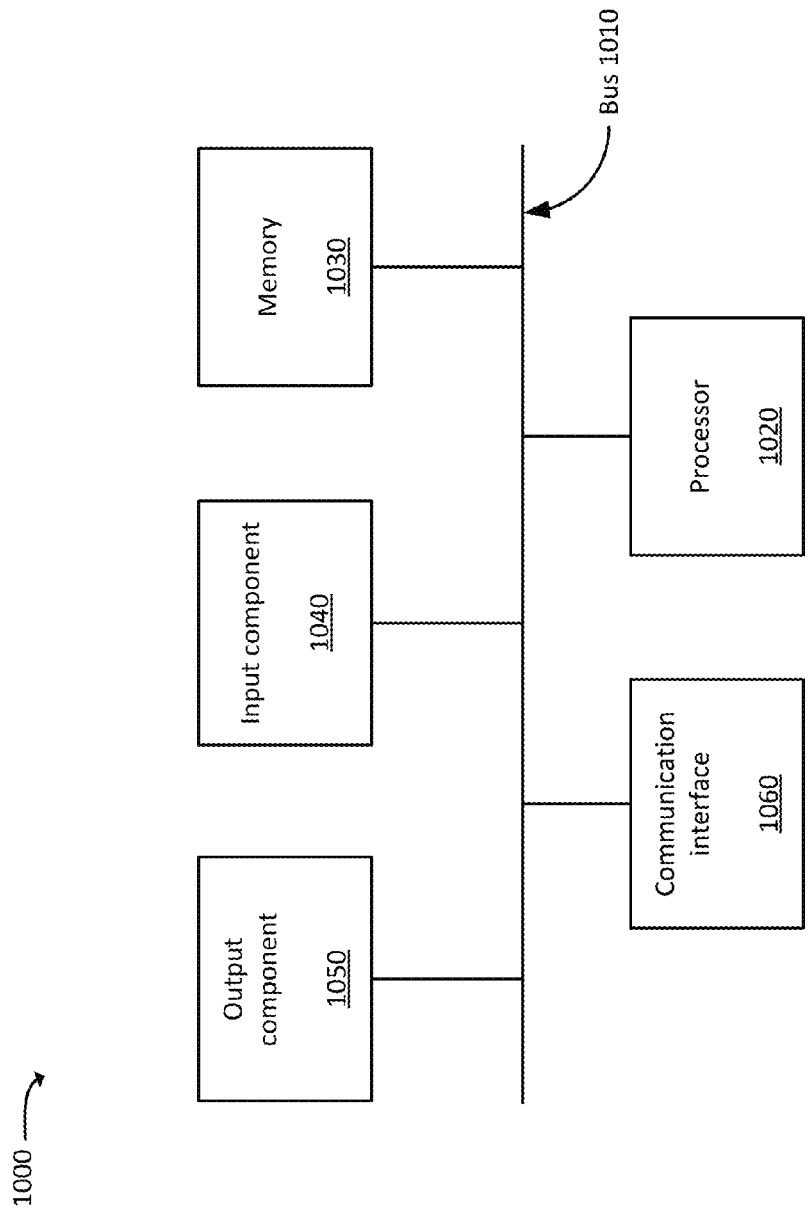
FIG. 10 illustrates example components of one or more devices, according to one or more implementations described herein.

FIG. 10 is a diagram of example components of device 1000. One or more of the devices described above (e.g., with respect to FIGS. 1, 2, and 6-9) may include one or more devices 1000. Device 1000 may include bus 1010, processor 1020, memory 1030, input component 1040, output component 1050, and communication interface 1060. In another implementation, device 1000 may include additional, fewer, different, or differently arranged components.

Bus 1010 may include one or more communication paths that permit communication among the components of device 1000. Processor 1020 may include a processor, microprocessor, or processing logic that may interpret and execute instructions. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000, such as a keyboard, a keypad, a button, a switch, etc. Output component 1050 may include a mechanism that outputs information to the operator, such as a display, a speaker, one or more light emitting diodes (LEDs), etc.

Communication interface 1060 may include any transceiver-like mechanism that enables device 1000 to communicate with other devices and/or systems. For example, communication interface 1060 may include an Ethernet interface, an optical interface, a coaxial interface, or the like. Communication interface 1060 may include a wireless communication device, such as an infrared (IR) receiver, a Bluetooth® radio, or the like. The wireless communication device may be coupled to an external device, such as a remote control, a wireless keyboard, a mobile telephone, etc. In some embodiments, device 1000 may include more than one communication interface 1060. For instance, device 1000 may include an optical interface and an Ethernet interface.

Device 1000 may perform certain operations relating to one or more processes described above. Device 1000 may perform these operations in response to processor 1020 executing software instructions stored in a computer-readable medium, such as memory 1030. A computer-readable medium may be defined as a non-transitory memory device. A memory device may include space within a single physical memory device or spread across multiple physical memory devices. The software instructions may be read into memory 1030 from another computer-readable medium or from another device. The software instructions stored in memory 1030 may cause processor 1020 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while series of blocks have been described with regard to FIGS. 4 and 5, the order of the blocks may be modified in other implementations. Further, non-dependent blocks may be performed in parallel.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown (e.g., in FIGS. 1, 2, and 6-9), in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

Some implementations are described herein in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "satisfying" a threshold (or similar terms) may be used interchangeably with "being greater than a threshold," "being greater than or equal to a threshold" "being less than a threshold" "being less than or equal to a threshold," or other similar terms, depending on the context in which the threshold is used.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
    capturing, by a camera processing device, camera data for storage;
    receiving, by the camera processing device, information relating to conditions external to the capturing of the camera data, the information including a plurality of individual quality scores that are each associated with an individual condition, wherein at least a first one of the individual quality scores is based on a condition relating to an existence of an external public security threat and a second one of the individual quality scores is based on whether a location of a user associated with the camera data is at a home of the user, the second of the individual quality scores being assigned a larger value when the user is not at the home of the user relative to when the user is at the home;
    generating a cumulative quality score based on the individual quality scores,
        the generating including combining the plurality of individual quality scores in a manner such that higher values for the plurality of individual quality scores result in a higher cumulative quality score;
    controlling, by the camera processing device, a resolution associated with the camera data based on the cumulative quality score such that a higher value of the cumulative quality score is associated with a higher resolution of the camera data than a lower value of the cumulative quality score; and
    storing, by the camera processing device, the camera data.

2. The method of claim 1, wherein the information relating to the conditions includes at least one of:
    information identifying an event,
    wherein controlling the resolution additionally includes modifying the resolution based on a type of the event.

3. The method of claim 1, wherein the information relating to the conditions includes at least one of:
    information identifying a type of network via which the camera processing device communicates, or
    information identifying weather in an area associated with the camera data,
    wherein controlling the resolution additionally includes controlling the resolution based on the information identifying the type of network or the information identifying the weather.

4. The method of claim 1, wherein controlling the resolution includes adjusting settings used to capture the camera data or compressing the camera data in order to adjust the resolution.

5. The method of claim 1, wherein the controlling the resolution includes recording audio data but not image data.

6. The method of claim 1, wherein the combining includes summing the individual quality scores.

7. The method of claim 1, wherein the condition relating to an existence of an external public security threat indicates whether an AMBER alert is in effect.

8. The method of claim 1, wherein the plurality of the individual quality scores include a third individual quality score that is set based on a preferred resolution setting of the camera data by the user.

9. A camera comprising:
    a non-transitory memory device storing:
    a plurality of processor-executable instructions; and
    a processor configured to execute the processor-executable instructions, wherein executing the processor-executable instructions causes the processor to:
        capture camera data for storage;
        receive information relating to conditions external to the capturing of the camera data, the information including a plurality of individual quality scores that are each associated with an individual condition, wherein at least a first one of the individual quality scores is based on a condition relating to an existence of an external public security threat and a second one of the individual quality scores is based on whether a location of a user associated with the camera data is at a home of the user, the second of the individual quality scores being assigned a larger value when the user is not at the home of the user relative to when the user is at the home;

generate a cumulative quality score based on the individual quality scores, the generating including combining the plurality of individual quality scores in a manner such that higher values for the plurality of individual quality scores results in a higher cumulative quality score;

control a resolution associated with the camera data based on the cumulative quality score such that a higher value of the cumulative quality score is associated with a higher resolution of the camera data than a lower value of the cumulative quality score; and store the camera data.

10. The camera of claim 9, wherein the information relating to the conditions includes at least one of:

information identifying an event, wherein executing the processor-executable instructions, to control the resolution, additionally causes the processor to modify the resolution based on a type of the event.

11. The camera of claim 9, wherein the information relating to the conditions includes at least one of:

information identifying a type of network via which the camera communicates, or information identifying weather in an area associated with the camera data, wherein executing the processor-executable instructions, to control the resolution, additionally causes the processor to adjust the resolution based on the information identifying the type of network or the information identifying the weather.

12. The camera of claim 9, wherein executing the processor-executable instructions, to control the resolution or audio bitrate, causes the processor to adjust settings used to capture the camera data or compressing the camera data in order to adjust the resolution.

13. The camera of claim 9, wherein executing the processor-executable instructions, to control the resolution, causes the processor to record audio data but not image data.

14. The camera of claim 9, wherein the combining includes summing the individual quality scores.

15. The camera of claim 9, wherein the plurality of the individual quality scores include a third individual quality score that is set based on a preferred resolution setting of the camera data by the user.

16. A method comprising:

receiving, by a device, camera data, captured by a camera and transmitted over a network;

storing, by the device, the camera data;

receiving, by the device, information relating to conditions external to the capturing of the camera data, the information including a plurality of individual quality scores that are each associated with an individual condition, wherein at least a first one of the individual quality scores is based on a condition relating to an existence of an external public security threat and a second one of the individual quality scores is based on whether a location of a user associated with the camera data is at a home of the user, the second of the individual quality scores being assigned a larger value when the user is not at the home of the user relative to when the user is at the home;

generating a cumulative quality score based on the individual quality scores, the generating including combining the plurality of individual quality scores in a manner such that higher values for the plurality of individual quality scores results in a higher cumulative quality score;

determining, by the device, whether to adjust a resolution of the camera data, based on the cumulative quality score such that a high value of the cumulative quality score is associated with a higher resolution of the camera data than a lower value of the cumulative quality score; and controlling, by the device and based on the determination, the camera to adjust the resolution of the camera data and to establish an amount of bandwidth required to transmit the camera data.

17. The method of claim 16, wherein the information relating to the conditions includes at least one of:

information identifying an event, wherein determining whether to adjust a resolution of the camera data is further based on information identifying a type of the event.

18. The method of claim 16, wherein the combining includes summing the individual quality scores.

19. The method of claim 16, wherein the plurality of the individual quality scores include a third individual quality score that is set based on a preferred resolution setting of the camera data by the user.

* * * * *